US005735987A

United States Patent [19]

Boriani et al.

[11] Patent Number: 5,735,987

[45] Date of Patent: Apr. 7, 1998

[54] METHOD AND DEVICE FOR FEEDING WRAPPING MATERIAL AND A TEAR STRIP TO A USER MACHINE

[75] Inventors: Silvano Boriani, Via Varolio; Antonio Gamberini, Via Nino Scota, both of Italy

[73] Assignee: G.D. Societa' Per Azioni, Bologna, Italy

[21] Appl. No.: 524,897

[22] Filed: Sep. 7, 1995

[30] Foreign Application Priority Data

Sep. 12, 1994 [IT] Italy ............................ B094A 000406

[51] Int. Cl.$^6$ ............................... B32B 31/18; A24C 1/00

[52] U.S. Cl. .......................... 156/176; 156/269; 156/285; 156/324; 156/361; 131/105; 131/280; 131/283

[58] Field of Search .................................... 156/250, 269, 156/285, 164, 324, 361, 176; 131/280, 283, 105

[56] References Cited

U.S. PATENT DOCUMENTS 2,691,856 10/1954 Jensen .
4,070,951 1/1978 Bala .
4,991,597 2/1991 Demny .

FOREIGN PATENT DOCUMENTS 0248225 12/1987 European Pat. Off. .
1156015 10/1963 Germany .
1511626 9/1969 Germany .

*Primary Examiner*—Michael W. Ball
*Assistant Examiner*—Sam Chuan Yao
*Attorney, Agent, or Firm*—Ladas & Parry

[57] ABSTRACT

A method and device for feeding wrapping material and a tear strip to a user machine, whereby a strip of wrapping material and a tear strip are fed continuously along respective paths to a joining station where they are joined integral with each other to form a wrapping strip complete with a tear strip; a compensating store for compensating the wrapping strip being located between the joining station and a cutting station at which the wrapping strip is cut into a succession of portions.

7 Claims, 1 Drawing Sheet

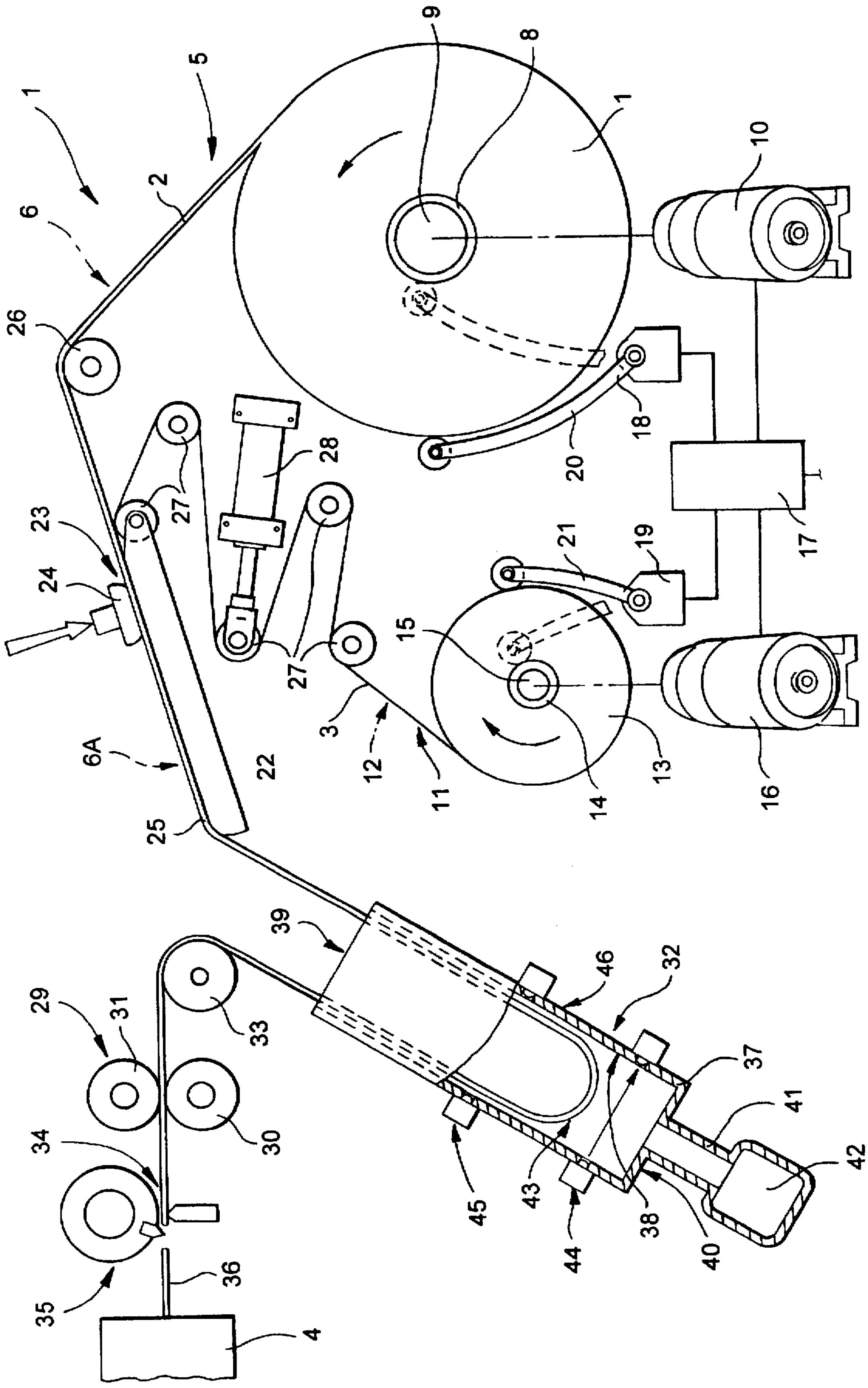
1
2
3
4
5
6
6A
8
9
10
11
12
13
14
15
16
17
18
19
20
21
22
23
24
25
26
27
28
29
30
31
32
33
34
35
36
37
38
39
40
41
42
43
44
45
46

METHOD AND DEVICE FOR FEEDING WRAPPING MATERIAL AND A TEAR STRIP TO A USER MACHINE

BACKGROUND OF THE INVENTION

The present invention relates to a method of feeding wrapping material and a tear strip to a user machine.

The present invention is particularly advantageous on machines for overwrapping packets or cartons of cigarettes, to which application the following description refers purely by way of example.

On known normally intermittent overwrapping machines, the wrapping material is generally fed continuously through a compensating store, which compensates for any cyclic difference in the supply and utilization speed of the wrapping material by varying the length of the path along which it is fed, and by imparting to the wrapping material a substantially constant tension.

Downstream from the compensating store, the wrapping material is joined to a tear strip to form a wrapping strip, which is fed to a cutting station where it is cut into portions, each forming an overwrapping for a packet or carton of cigarettes.

On overwrapping machines of the above type, the wrapping material of each portion, when cut off, has been found to pucker along the edges of the portion adhering to the tear strip, thus making it practically unusable.

SUMMARY OF THE INVENTION

It is an object of the present invention to provide a method of feeding wrapping material and a tear strip to a user machine, designed to overcome the aforementioned drawback.

According to the present invention, there is provided a method of feeding wrapping material and a tear strip to a user machine, the method comprising the steps of feeding the wrapping material along a given path; imparting a given tension to the wrapping material along a portion of said path; and joining a tear strip to the wrapping material at a joining station, so as to form, at the joining station, a wrapping strip complete with a tear strip; characterized in that the tear strip is joined to the wrapping material upstream from said path portion.

The present invention also relates to a device for feeding wrapping material and a tear strip to a user machine.

According to the present invention, there is provided a device for feeding wrapping material and a tear strip to a user machine, the device comprising traction means for feeding a strip of wrapping material along a first given path; supply means for feeding a tear strip along a second path comprising a portion coinciding with a portion of the first path; a joining station located at the input of said portion of the first path, to form a wrapping strip complete with a tear strip and traveling along said path portion towards said traction means; and counteracting means located along said first path, upstream from said traction means, for imparting a given tension to the strip of wrapping material extending, in use, between the counteracting means and the traction means; characterized in that said counteracting means are located along said portion of the first path.

BRIEF DESCRIPTION OF THE DRAWING

The present invention will be described with reference to the accompanying drawing, which shows a partially sectioned, schematic side view, with parts removed for clarity, of a preferred, non-limiting embodiment.

DETAILED DESCRIPTION OF THE INVENTION

Numeral 1 in the accompanying drawing indicates a device for continuously feeding a strip of wrapping material 2 and a tear strip 3 to an overwrapping machine 4.

Device 1 comprises a first line 5 for feeding material 2 to machine 4 along a path 6, material 2 being unwound off a reel 7 having a core 8 mounted on a shaft 9 rotated counterclockwise (in the drawing) about its axis by a motor 10; and a second line 11 for feeding tear strip 3 along a path 12 and off a reel 13 having a core 14 mounted on a shaft 15 rotated clockwise (in the drawing) about its axis by a motor 16. A control unit 17 provides for feedback controlling motors 10 and 16 to maintain the same surface speeds of reels 7 and 13, the diameters of which are constantly controlled by respective known position transducers 18 and 19 on the basis of measurements made by respective known feeler elements 20 and 21.

Path 12 of tear strip 3 converges with path 6 on a conveyor plate 22 at a joining station 23 where a pressure pad 24, moved to and from an operating position contacting plate 22 by a known actuating device (not shown), joins tear strip 3 integrally with material 2 on plate 22 to form a wrapping strip 25 complete with a tear strip. More specifically, downstream from station 23, path 6 has a portion 6a in common with path 12, whereas, upstream from station 23, path 6 extends about a guide roller 26, and path 12 about a series of diverting rollers 27, one of which is a compensating roller connected to an actuator 28 for moving the compensating roller transversely and so varying the length of path 12 for the reasons explained later on.

Device 1 also comprises a traction assembly 29, in turn comprising a powered unwinding roller 30 and a pressure roller 31 rotating in opposite directions and which provide for feeding strip 25 along path portion 6a through a compensating store 32 and about a diverting roller 33 to a cutting station 34 where it is cut in known manner into a succession of portions 36 by a known cutting unit 35 comprising a movable blade and a fixed countertrade.

As shown in the accompanying drawing, station 23 is located at the input end of portion 6a, assembly 29 is located immediately upstream from station 34 and substantially at the output end of portion 6a, and compensating store 32 is located along portion 6a and upstream from assembly 29 and roller 33.

Store 32 provides for compensating any cyclic difference in the supply and utilization speeds imparted to strip 25 by motors 10, 16 and traction assembly 29 respectively, and for imparting to strip 25 a given, substantially constant tension. For this purpose, store 32 comprises a cup-shaped container 37 defining an inner chamber 38, one end of which communicates externally via an opening 39, and the opposite end of which is closed by a bottom wall 40 fitted with a conduit 41. Conduit 41 communicates with a known suction source 42 for generating a vacuum inside chamber 38 and drawing in a portion of strip 25 to form, inside chamber 38 and through opening 39, a loop 43, the length of which varies with time and is controlled by two optical sensors 44, 45 mounted on the lateral wall 46 of container 37 and which operate, in known manner, for controlling motors 10 and 16 so that the length of loop 43 is maintained within a given range. The substantially constant vacuum inside chamber 38 also provides for imparting a substantially constant given tension to the portion of strip 25 extending along portion 6a, and more specifically, to the portion of strip 25 extending between chamber 38 and assembly 29.

Consequently, material 2 and tear strip 3 are fed to joining station 23 at speeds maintained substantially equal by control unit 17; actuator 28 and the compensating roller provide for varying the length of path 12 to compensate for any minor differences in the above two speeds, with substantially no tension being applied to tear strip 3; and material 2 and tear strip 3 are pushed (as opposed to drawn) by motors 10 and 16 to station 23. Since, upstream from station 23, material 2 and tear strip 3 have substantially no tension and no difference in speed, strip 25 downstream from station 23 presents no difference in tension between material 2 and tear strip 3, both of which are subjected to the same tension by store 32. The situation at station 23 is again repeated in each portion 36, in which the tension imparted to strip 25 by store 32 is obviously eliminated.

In other words, portions 36 also have no difference in tension between material 2 and tear strip 3, thus eliminating any possibility of puckering of material 2 in the region contacting tear strip 3.

What is claimed is:

1. A method of feeding a wrapping material strip and a tear strip to a user machine, said method comprising feeding the wrapping material strip and the tear strip along respective first path portions to a joining station; controlling tension of the two strips along said first path portions so that the two strips have substantially the same tension and substantially zero tension at said joining station; joining the two strips at the joining station to form a combined wrapping strip complete with tear strip; advancing said combined wrapping strip along a second path portion towards the user machine; and imparting a given tension to the combined wrapping strip along said second path portion.

2. A method as claimed in claim 1, wherein the tension of the two strips along said first path portions is controlled by pushing said two strips towards said joining station.

3. A method as claimed in claim 2, wherein the tension of the two strips along said first path portion is controlled by pushing said two strips at the same speed towards said joining station.

4. A method as claimed in claim 3, wherein said two strips are wound on respective reels and are pushed towards said joining station along said first path portions, by driving said reels to provide equal surface speeds of the reels.

5. A method as claimed in claim 1, wherein said second path portion extends upstream from a cutting station at which said combined wrapping strip is cut into portions.

6. A method as claimed in claim 1, wherein said given tension is applied to said combined wrapping strip by drawing said combined wrapping strip by suction into a compensating vacuum chamber.

7. A method as claimed in claim 1, wherein the tension of the two strips along said first path portions is controlled by pushing said two strips towards said joining station.

* * * * *